May 26, 1942. W. C. BUTTNER 2,283,970
VALVE
Filed Nov. 16, 1939
Fig. 1.
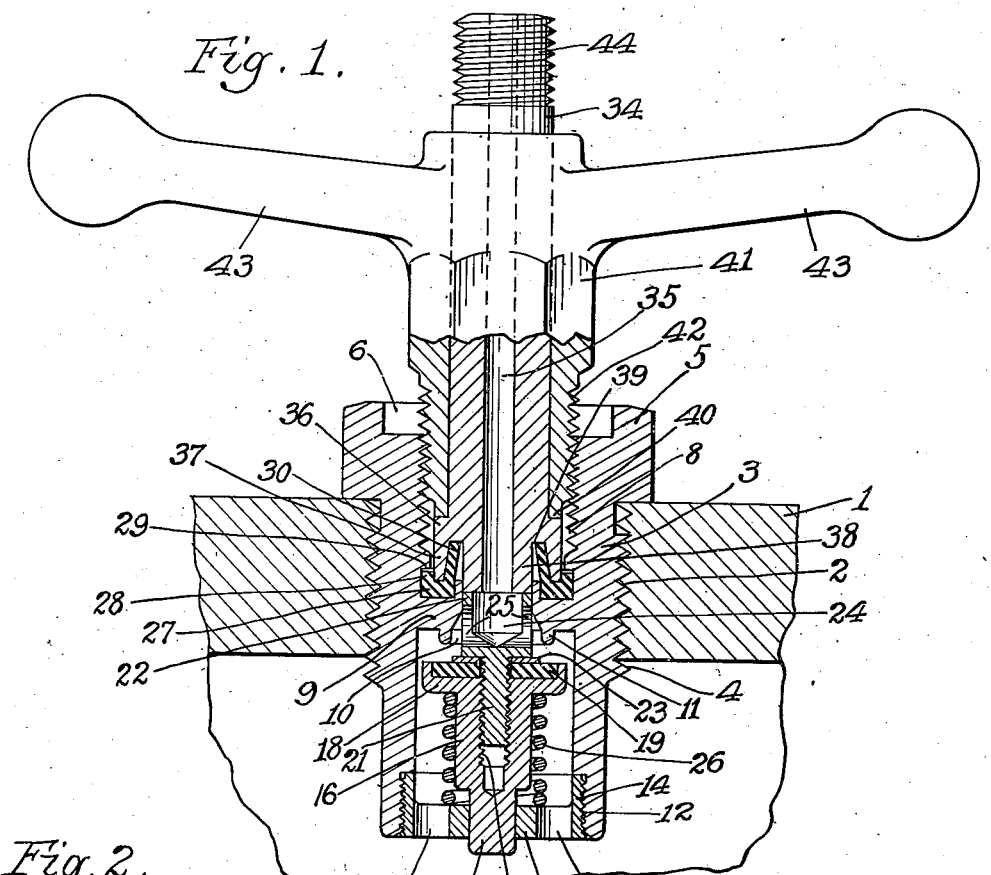
Fig. 2.
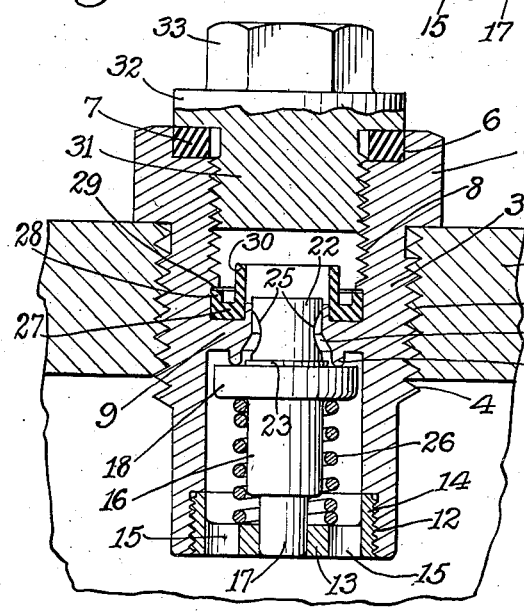
Fig. 3.
Inventor.
William C. Buttner
by Parker + Carter.
Attorneys.

Patented May 26, 1942

2,283,970

UNITED STATES PATENT OFFICE 2,283,970

VALVE

William C. Buttner, Winnetka, Ill., assignor to The Bastian-Blessing Company, Chicago, Ill., a corporation of Illinois Application November 16, 1939, Serial No. 304,639

8 Claims. (Cl. 284—14)

This invention relates to a cylinder valve and has for one object to provide a valve so arranged that when the valve is connected to a passage and is opened, sealing will be provided immediately upon the opening of the valve and prior to the final seating of the connection member. Another object is to provide means in connection with a cylinder valve whereby pressure from within the valve effects sealing as soon as the valve is opened by a connection member. Another object is to provide in connection with a cylinder valve which is subject to internal pressure means which provides, first, upon the opening of the valve a sealing effect in response to pressure from within the valve and, later, upon final seating of a connection member, a positive mechanical seating.

Other objects will appear from time to time throughout the specification and the claims.

The invention is illustrated more or less diagrammatically in the accompanying drawing, wherein:

Figure 1 is a longitudinal section through the valve and associated parts, showing the valve open and fully sealed;

Figure 2 is a similar sectional view showing the valve closed;

Figure 3 is a detail similar to Figure 1, showing the connector not fully seated.

Like parts are designated by like characters throughout the specification and the drawing.

1 indicates a tank or enclosure wall which is provided with a perforation or opening 2 which is internally threaded as shown to receive a valve housing 3. The valve housing is generally hollow as shown and is preferably provided with a threaded portion 4 which is threadingly engaged in the threaded opening 2 of the wall member 1. At its outer end, the valve housing 3 may be enlarged as at 5, and this enlargement is preferably given an angular cross section by means of which it may be engaged by a tool to be seated and unseated when necessary. It may, also, be provided with an annular cavity 6 within which a gasket or sealing member 7 may be seated if desired.

The valve housing 3 is preferably threaded internally as at 8. A partition-like member 9 is formed in the valve housing, and a passage or perforation 10 is formed in the partition 9. A raised valve seat 11 may be formed on one side of the partition to receive a valve as will be described below. Adjacent its inner end, the valve housing 3 may be interiorly threaded as at 12 to receive a retainer member 13. This member comprises an annular portion 14 suitably threaded exteriorly to engage the threading 12. One or more perforations 15 are formed in the member 13. A valve body 16 may be reduced as at 17 and is received in a suitable perforation in the member 13. The valve body is enlarged as at 18 to receive a packing member 19. The valve body is preferably hollow and interiorly threaded as at 20 to receive a correspondingly threaded shaft 21 of a valve projection 22. Between the valve projection 22 and the packing 19 may be positioned a washer 23. The projection 22 serves thus as means for holding the packing 19 in place and serves, also, as a contact member, as will be described below. It is preferably hollow interiorly as at 24 and has one or more perforations or openings 25 in its sides. A spring 26 is positioned about the valve body 16 and bears at one end upon the enlargement 18 and at the other end upon the member 13. It tends, when free to do so, to force and hold the valve closed.

Positioned within the outer portion of the valve housing 3 is a cup-like sealing member 27. This is formed of flexible material. It may be of rubber or leather or synthetic material suitable for sealing. As shown, it includes an outer, generally cylindrical portion 28 which fits behind a shoulder 29 formed by undercutting the inner surface of the valve housing 3. It includes, also, a longer, internal annular member 30. In the particular form here shown, both the portion 28 and the portion 30 extend toward the outside of the valve and away from the interior of the container to which the valve is seated.

To close the valve, as shown in Figure 2, a plug-like member 31, which is suitably threaded, is seated in the threaded portion 8. The gasket 7 is engaged within the annular space 6 and compressed beneath the enlargement 32 of the plug 31. The outer end of the plug may have an angular cross section 33, as shown in Figure 2, to be readily engaged by a tool.

When the valve is to be opened and connected to a system into which the contents of the tank are to be discharged, a connector is removably secured to the valve, as shown in Figure 1. As there shown, the connector comprises a hollow member 34 which is provided with the passage 35. The member 34 is enlarged at its inner end as at 36 and provided with an outer, annular, skirt-like portion 37. It is provided, also, with an inner, downwardly or inwardly extending portion 38 and between these two annular portions an annular groove or trough 39 is formed into which the portion 30 may be received. The connector 34 is preferably provided on its outside with a shoulder 40. A thumb nut 41 is positioned about the connector and may bear against the shoulder 40. It is threaded exteriorly as at 42 to engage the threading 8 of the valve housing 3. Outwardly projecting members 43, 43 are formed on the thumb nut and by means of these it may be readily rotated for engagement or disengagement with the valve housing. At its outer end, the connector 34 may be threaded as at 44 to receive a tube or a conduit or a second connector member by means of which it and, in particular, the passage 35 through it may be joined to a system of pipes or conduits through which material may flow from within the tank to a point of use or vice versa.

As shown in Figure 1, the groove or trough 39 may have the inner surface of its outer wall tapered or inclined as shown so that as the connector 34 is moved downwardly toward the position of Figure 1, the annular member 30 contacts it and is to some degree crowded or bent inwardly.

The use and operation of this invention are as follows:

The valve as shown will ordinarily be used in a tank in which fluid is carried and from which fluid is discharged. As shown in Figure 2, the tank is closed for travel or at least is inactive and discharge is not taking place. Any form of closure may be used and the particular form shown is unimportant. When material is to be discharged from the tank, the plug is removed and the connector of Figure 1 is inserted. Ordinarily, this connector will be fastened to a conduit leading to a point of use or reception for the fluid which is to be discharged from the tank. Since the fluid in the tank is generally under pressure, it is important to prevent escape of the fluid during the brief time after the valve is opened and before the connector is fully seated. It is, of course, also important to prevent escape should the operator carelessly leave the connector only partially seated.

To accomplish the purpose indicated, the cup-like sealing member is provided. As the connector is forced into engagement with the cup, the portion 30 first extends into the annular space 39 of the connector. Some time after this has taken place, the inner end of the connector portion 38 contacts the valve portion 22 and forces the valve from its seat. At this point, pressure might leak past the valve and escape from the connector but pressure passing the valve in the outward direction is exerted upon the inside of the skirt-like sealing portion 30 and forces it with sealing engagement against the skirt-like portion 37 of the connector. Thus, leakage cannot take place because the skirt-like portion 30 will have entered the annular groove 39 before the valve is "cracked" open. As the connector is moved farther in the sealing direction, the skirt 30 penetrates farther into the groove 39. Finally, it contacts the inner end of the groove and the outer edges of the portion 37 of the connector are seated in the groove formed between the members 28 and 30. Thus, there is formed, first, a pressure seal and, finally, a positive mechanical seal, and leakage from the system during the time that the valve is open and before a complete mechanical seal is accomplished is prevented, and leakage past the valve does not occur.

Figure 3 shows the connector 34 only partially seated. In that position, the annular member 30 lies within the groove 39 but the mechanical fit between the two is not sufficiently tight to effect sealing. The parts are, however, so positioned that pressure escaping from the interior of the tank will force the member 30 against the inner face of the outer wall of the groove 39 and will effect by this pressure action an effective seal to prevent leakage. If there were no pressure in the tank, this sealing effect would not occur. In the fully seated position of Figure 1, complete sealing occurs—mechanically as well as by pressure—because not only is the upper edge of the member 30 seated in the bottom of the groove 39 but the bottom edge of the connector portion 37 is seated against the portion 27, and in the groove between the portions 28 and 30. This complete mechanical sealing is assisted by pressure. Should any pressure escape so as to contact the inner face of the member 30, it would force that member outwardly against the wall of the connector groove 39 and prevent leakage. In the partially seated position of the connector, there is, therefore, only a pressure seating effect. Due to the fluid pressure from within the tank, there is no positive mechanical sealing. In the absence of pressure within the tank, there will be no positive leakproof seal at this stage, which is illustrated in Figure 3. In the final closed position of Figure 1, there is both a mechanical sealing and seating effect as well as the additional pressure sealing effect.

I claim:

1. A coupling comprising a body having a valve seat therein defining a valve port, a valve member urged into contact with the seat to close the port, a nipple received in the body with a rectilineal movement to open the valve, said nipple having a passageway therethrough, means intermediate the nipple and the valve by which rectilineal force is transmitted from the nipple to the valve including a portion having lateral openings therethrough interconnecting said port and the passageway in the nipple, an axially directed annular flange upon the nipple having an area thereon defining a surface of revolution radially spaced from said openings, a resilient sealing member having a portion spaced from the nipple and engaging said surface of revolution upon the flange in sealed relationship during said rectilineal movement.

2. A coupling comprising a body adapted to be received in the wall of a pressure vessel and having a valve compartment therein terminating at one end in a valve seat with a port therethrough and threaded at the other end, a valve stem disposed in said compartment, a resilient disk carried by the valve stem to cooperate with said valve seat, a valve retainer received in the threaded end of the body for supporting the stem in guided relationship, a compression spring urging the disk into contact with the seat, a disk retainer threaded into the valve stem for holding the disk in place and having a portion extending through said port, a shoulder beyond said port, a resilient member disposed upon said shoulder, means for holding the resilient member in place including a reduced portion having an internal thread, a manually driven wing nut received in said internal thread, and means driven by said wing nut for moving said disk retainer to depress it under a rectilineal movement including a member having a conduit therethrough and having sealed engagement with said resilient member.

3. A coupling for the transfer of liquefied petroleum gas comprising a body having a valve seat surrounding a valve port, a valve member cooperating with said seat, means urging said valve to its closed position, a hollow nipple for opening the valve and having a central portion provided with an opening through the end thereof, an element intermediate the valve and the nipple having lateral openings interconnecting the hollow nipple and the port, seal means carried by said nipple and spaced radially from said central portion, and a packing member having a resilient portion thereon contacting said seal means without contact with said intermediate element at the lateral openings during the opening of the valve.

4. A fitting for a liquefied petroleum gas dispenser comprising a threaded body having a threaded valve compartment in one end and a threaded cavity in the other end separated by an apertured partition upon one side of which is a valve seat around said aperture and upon the other side of which is disposed a shoulder at the inner end of the threading in the cavity, a resilient means disposed in said cavity including an annular portion held in sealing relationship upon said shoulder, a valve in said valve compartment, a valve disk upon the valve, valve retaining means threaded into said threaded compartment, a spring carried thereby for urging said valve disk into contact with the valve seat, and a valve disk retaining element upon the valve extending into said aperture for actuating said valve.

5. A fitting adapted to be received in the wall of a pressure container comprising a threaded body having a valve compartment in one end and a threaded cavity in the other end divided by a radially inwardly extending flange intermediate its ends, said flange being provided with a port and a valve seat, a resilient sealing means in sealing relationship with a shoulder in the body upon the cavity side of the flange, an axially extending flange upon the sealing means defining a surface of revolution upon one side and adapted upon the other side to be in open communication with said port, said fitting adapted to have a nipple element screw-threaded into said cavity and having axially extending sealing flange means to engage the flange upon the sealing means, a projection in the nipple, a valve urged into contact with the valve seat, and including an element engaged by said projection to guide the valve with respect to the seat.

6. A fitting for a liquefied petroleum gas dispenser comprising a unitary body construction having a valve compartment threaded at one end and terminating at the other end in a radially extending flange having a port therethrough surrounded by a valve seat, a valve member disposed in said compartment, a valve disk carried by the valve to cooperate with said valve seat, valve retainer received in the threaded end, and supporting the stem in guided relation, a spring urging the disk into contact with the seat, a disk retainer threaded into the stem for holding the disk in place and extending into said port to guide the valve disk into engagement with the seat, an outwardly presenting shoulder in the body beyond the port, a resilient seal member disposed upon the shoulder, means for securing the resilient member in place including a portion having an internal thread thereon adapted to receive a drive nut for opening the valve with a rectilineal movement, and means for securing the unitary body to a liquefied petroleum gas container.

7. A fitting for a liquefied petroleum gas tank comprising a threaded body having a threaded valve compartment opening upon the end thereof which is received in the tank and a threaded cavity in the other end, a radially disposed flange integral with the body and dividing the compartment and cavity, said flange defining a valve port, an outwardly presenting shoulder in the cavity, a seal member disposed in said cavity including an annular portion held in sealing relationship upon said shoulder, and having a portion exposed to the pressures existing in said port, a valve in said valve compartment received and removable only through the opening in the body at the mouth of the valve compartment, a valve disk upon the valve, a valve retaining element threaded into said compartment, a spring disposed between the valve and element for urging the valve to carry the valve disk into closing contact with the valve seat, and a valve disk retaining element upon the valve extending through said port for actuating the valve.

8. A readily separable and attachable coupling for the transfer of liquefied petroleum gas comprising a body having a valve compartment therein terminating at one end in a port surrounded by a valve seat, a valve normally urged to contact the seat, a nipple movable rectilineally with respect to the axis of said port and having a pocket defined by a concave wall opening towards said valve, means contacted by said nipple for unseating the valve during said rectilineal movement, seal means engaging the nipple including a resilient element having a resilient portion providing a wall adapted to engage the nipple before the valve is unseated, said resilient portion being distended more tightly against said concave wall during said rectilineal movement by the fluid pressure present in said port.

WILLIAM C. BUTTNER.